United States Patent [19]

Barabas et al.

[11] 4,345,273
[45] Aug. 17, 1982

[54] BROAD BAND SWITCHING SYSTEM

[75] Inventors: Udo Barabas; Karl-Heinz Moehrmann; Hans-Marlin Christiansen, all of Munich, Fed. Rep. of Germany

[73] Assignee: Siemens Aktiengesellschaft, Berlin & Munich, Fed. Rep. of Germany

[21] Appl. No.: 203,980

[22] Filed: Nov. 4, 1980

[30] Foreign Application Priority Data

Nov. 6, 1979 [DE] Fed. Rep. of Germany ....... 2944784

[51] Int. Cl.³ .......................... H04N 7/18; H04B 9/00
[52] U.S. Cl. ...................................... 358/86; 358/181; 370/4; 370/58; 455/608; 455/617
[58] Field of Search ................................. 358/86, 181; 179/18 G F; 333/101; 340/166 R; 455/600, 608, 617; 370/4, 58

[56] References Cited

U.S. PATENT DOCUMENTS 3,980,831 9/1976 Mertel .
4,274,112 6/1981 Leysieffer ...................... 179/18 GE

FOREIGN PATENT DOCUMENTS 2828662 6/1979 Fed. Rep. of Germany .
2856217 7/1980 Fed. Rep. of Germany .
1001903 8/1965 United Kingdom .

OTHER PUBLICATIONS

Electronics Letters, vol. 13, No. 25, Dec. 1977, pp. 765–766, R. Tell et al. "Multiplexer at 5 Gbit/s for Fibre-Optical Communication Systems".
Pfannschmidt "Arbeitsgeschwindigkeitsgrenzen von Koppelnetzwerken für Breitband-Digitalsignale" Dissertation, Technical University, Braunschweig, 1978, pp. 42–45.
Bauch "Künftige Kommunikationstechnik mit Lichtleitern" ntz, vol. 32 (1979), No. 3, pp. 150–153.

Primary Examiner—Howard Britton
Attorney, Agent, or Firm—Hill, Van Santen, Steadman, Chiara & Simpson

[57] ABSTRACT

The exemplary embodiment may be used for television (TV) signals and, if desired, also for radio, digital telephone, picture screen text and/or television telephone signals. For the reduction of the circuit-technical outlay of the actual broad band switching network, each TV program (Pl . . . Pp) is multiply supplied to a program-individual input (El . . . Ep) of the broad band switching network in time-division multiplex in a plurality of time channels; via the broad band switching network, each subscriber (Tq . . . Tt) has simultaneous access in the plurality of time channels to a corresponding plurality of programs (Pl . . . Pp). In the broad band switching network, the individual program signal sources (Pl . . . Pp) are respectively connected to coupling point switches belonging to the respective input (El . . . Ep) and leading to the individual outputs, being connected via a fan-out arrangement of constantly unlocked ECL elements respectively exhibiting a plurality of outputs; said coupling point switches can likewise be realized by means of ECL linkage elements.

2 Claims, 4 Drawing Figures

BROAD BAND SWITCHING SYSTEM

BACKGROUND OF THE INVENTION

The invention relates to a broad band switching system for the selective connection of broad band signal sources to subscribers receiving broad band signals, said connection being via a broad band switching network in which the crosspoint or coupling point circuits, whose function is to selectively connect input lines to output lines of the switching network, can be formed by means of linkage elements realized in ECL technology with a view to the smallest possible switching times or, respectively, the, preferably, pulse-modulated signals with signal frequencies of, for example, up to more than 80 MHz to be through-connected (cf. Pfannschmidt: "Arbeitsgeschwindigkeitsgrenzen von Koppelnetzwerken für Breitband-Digitalsignale", Diss. TU Bswg. 1978; German AS 2,828,662).

With such a broad band switching network, for example, television programs can be relayed to subscribers who wish to receive such programs, as is involved in more recent developments of telecommunications which lead to broad band communication networks with subscriber lines formed by means of light waveguides, whereby a star network of light waveguides with one light waveguide per dwelling unit proves favorable at the subscriber level, said light waveguide connecting a broad band switching location (preferably, spatially united with the nearest telephone switching location) to the dwelling of the subscriber and via which all telecommunication services are sequenced for the appertaining dwelling, whereby offering at least approximately the following communication possibilities comes into question, for example, for a dwelling connection which does justice to future developments:

three video channels for three video receivers with independent access to all television signal sources which can be reached by the switching location or, respectively, to all television programs available in the switching location, three return channels for program selection and, under certain conditions for developing interactive services, as well as a greater plurality of VHF radio channels (stereo) (ntz 32 (1979)3, pages 150 through 153).

Given such a television program exchange, it is not only that a plurality of subscriber terminals must be able to be simultaneously connected to one and the same program source, but, rather, vice versa, one and the same subscriber terminal must also be able to be simultaneously connected to a plurality of program sources. The invention reveals a way of doing justice to this in an expedient, cost-saving manner.

SUMMARY OF THE INVENTION

The invention relates to a broad band switching system for the selective connection of broad band signal sources, particularly TV program sources, to subscribers receiving broad band signals via a broad band switching network via which the broad band signals, particularly TV signals, are transmitted as pulse modulated signals; this broad band switching system is inventively characterized in that the signals of the individual signal sources are multiply supplied to the resective signal source-allocated input of the broad band switching network, being respectively supplied in time-division multiplex, in a plurality of time channels corresponding to the plurality of signal sources which can be simultaneously connected to one and the same subscriber, said plurality of time channels belonging to a time-division multiplex system encompassing at least these time channels and in that, in the broad band switching network, the subscriber-individual outputs are respectively connected to the respectively desired signal source in subscribed-individually defined time channels of the said plurality of time channels.

In addition to the advantage that the broad band switching network is not in need of an additional spatial extent corresponding, for instance, to the plurality of signal sources simultaneously connectible to one and the same subscriber proceeding beyond the extent corresponding to the plurality of the signal sources and to the plurality of the subscribers, whereby no additional demands are made of the cross-point or coupling point switches due to the switching-on or, respectively, switching-off during corresponding time frames, said cross-point switches being capable anyway of transmitting the broad band pulse signals, the invention also produces the further advantage that a corresponding limitation of the circuit-technical outlay required for connecting the broad band signal sources to the respectively appertaining cross-point switches is also connected therewith.

Thereby, this outlay can be even further reduced, as details also of interest within the framework of the present invention are specified in the related German application P 29 44 794.7 filed Nov. 6, 1979, and in the corresponding U.S. application for patent of Dr. Udo Barabas, entitled "BROAD BAND SWITCHING NETWORK", U.S. Ser. No. 203,977, filed Nov. 4, 1980, in that, in a further development of the invention, constantly unlocked ECL linkage elements with a plurality of outputs are provided for the connection of the individual inputs of the switching network to the cross-point switches appertaining to the respective input and leading to the various outputs of the switching network whereby cross-point switches, in which the broad band signals have experienced $2n-2$ negations (with $n=1,2,\ldots$) in the said ECL linkage elements preconnected in iterative network to the cross-point switches, on the one hand, and cross-point switches, in which the broad band signals have experienced $2n-1$ negations (with $n=1,2,\ldots$) in the said ECL linkage elements preconnected in iterative network to the cross-point switches, on the other hand, are formed by means of ECL linkage elements with a linkage function interchanged with one another with respect to the encoded broad band signals, preferably by means of AND elements and by means of NOR elements.

In a further development of the invention for the purpose of the said multiple feed of the broad band signals to the respective, signal source-individual input of the broad band switching network, the signal source is expediently sampled with a frequency corresponding to the said plurality of time channels, and the pulse modulated signals representing the sampling values are supplied to the signal source-individual input of the switching network; this has the advantage of an accordingly low circuit-technical outlay.

In an afternative development of the invention, however, one can sample the individual signal sources with a respective sampling rate corresponding only to one time channel and fan out the pulse modulated signal representing the respectively obtained sampling value into a plurality of line paths corresponding to the plurality of time channels, in which line paths delays occur which differ step-by-step respectively by the duration of a time slot and which are combined at the output side at the signal source-individual input of the switching network.

Let it be pointed out at this point that it has already been proposed (in the German patent application 2,856,217.6) to proceed in such manner for the common transmission of video and audio signals via a light waveguide connection, particularly between a central exchange and a subscriber terminal, that the video and audio signals to be transmitted are converted into pulse phase modulated (PPM) signals and these are transmitted after they are combined into a time-division multiplex signal, whereby the time-division multiplex signal transmitted to the subscriber can contain four television signals respectively including audio, of which one is optionally a television telephone signal, 48 monoaudio program signals corresponding to 24 stereo audio signals and at least one digital telephone signal, and the time-division multiplex signal transmitted from the subscriber to the central exchange can contain a television telephone signal, a selection signal for television programs, at least one digital telephone signal and, optionally, a subscriber signal channel; problems of broad band signal switching, however, are thereby not touched on in detail.

The invention will be described in yet greater detail on the basis of the accompanying drawing sheet; and other objects, features and advantages will be apparent from this detailed disclosure and from the appended claims.

DETAILED DESCRIPTION

Figure 1:
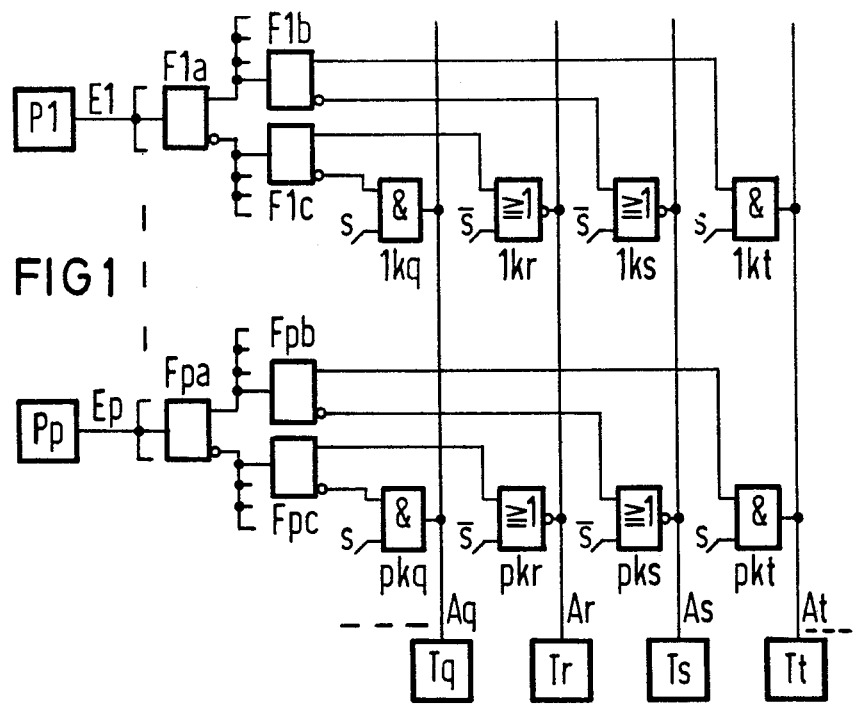
FIG. 1 shows an exemplary embodiment for a broad band switching system according to the invention.

In a scope necessary for an understanding of the invention, FIG. 1 schematically shows a broad band switching system with a broad band switching network via which broad band signal sources P1 . . . Pp which may, in particular, be given by means of television program sources, are connectible to subscribers receiving broad band signals . . . , Tq, . . . , Tt . . . ; these subscribers may, for example represent a dwelling terminal, as is revealed, for example, in the German application P2951 495.2 filed Dec. 20, 1979, and in the corresponding U.S. application for patent of Hans-Martin Christiansen, entitled "BROAD BAND TELECOMMUNICATION SYSTEM" U.S. Ser. No. 203,981 filed Nov. 4, 1980 with further details which may be of interest, and via which a plurality of communication possibilities may respectively be given in the manner initially discussed. Thereby, the individual broad band signal sources P1 . . . Pp are connected to signal source-individual inputs E1 . . . Ep of the broad band switching network at whose subscriber-individual outputs . . . , Aq, Ar, As, At, . . . the subscribers . . . Tq, Tr, Ts, Tt, . . . are connected; the individual input lines E1 . . . Ep are connectible to the output lines . . . , Aq, . . . , At, . . . via cross-point or coupling point switches . . . , lkq, . . ., pkt, . . . .

The cross-point switches . . . , lkq, . . . , pkt, . . . are formed by means of linkage elements preferably realized in ECL technology which, thereby, without this being illustrated in greater detail in the drawing, may be respectively combined in plurality on a chip in monolithic integration. Proceeding therefrom that the individual broad band signal sources P1 . . . Pp are not to be loaded with too low impedance and are not to be loaded with circuit capacitances which are too great, i.e., are not to be loaded with a randomly great number of directly connected cross-point switches or, respectively, subsequent subscribers, constantly unlocked ECL linkage elements, for example, of the type 10101 with a plurality of outputs without or, respectively, with negation, are provided for the fanning out of the individual inputs E1 . . . Ep of the broad band switching network to the cross-point switches appertaining to the respective input and leading to the various outputs of the broad band switching network. Thus, for example, in the broad band switching network according to FIG. 1 with a fanning (fan-out) assumed to be two-stage here, the input E1 is connected to the cross-point switch lkt leading to the output At, being connected via the non-negating output of such a linkage element Fla and the non-negating output of a further linkage element Flb, to the cross-point switch lks leading to the output As, being connected via the non-negating output of the linkage element Fla and the negating output of the further linkage elment Flb, to the cross-point switch lkr leading to the output line Ar, being connected via the negating output of the linkage element Fla and the non-negating output of a further linkage element Flc, and to the cross-point switch lkq leading to the output line Aq, being connected via the negating output of the linkage element Fla and the negating output of the further linkage element Flc.

In an analogous manner, the input Ep of the broad band switching network is connected via linkage elements Fpa, Fpb, Fpc to cross-point switches pkt, pks, pkr, pkq which in turn likewise lead to the said outputs AT, As, Ar, Aq of the broad band switching network.

It is to be pointed out in this context that the said linkage elements . . . , Fla, . . . Fpc, . . . need fundamentally exhibit only one input line and are also illustrated in the drawing with only a single input line, but, in addition, can also have at least one further input line, proceeding from which they are then constantly unlocked by means of the connection of a corresponding unlocking signal, i.e., are prepared for a signal transmission via the broad band signal path illustrated in FIG. 1.

Given the described exploitation both of the outputs without negation as well as the outputs with negation, a broad band signal to be through-connected, said broad band signal being preferably pulse code (PC) or pulse phase (PP) modulated, can thus have experienced a negation—under certain conditions, a multiple negation as well—on this path or not, depending upon which fanning (fan-out) path leads from one input of the broad band switching network to a specific cross-point switch. Thereby, under certain conditions, an uneven plurality of negations would have to be compensated by means of an additional negation. Expediently instead of this, however, and this is also shown in FIG. 1, those cross-point switches in whose case the broad band signals have experienced $2n-2$ negations (with $n=1,2,\ldots$) in the said ECL linkage elements preconnected to the cross-point switches in interative network, on the one hand, and those cross-point switches in whose case the broad band signals have experienced $2n-1$ negations (with $n=1,2,\ldots$) in the said ECL linkage elements preconnected to the cross-point switches in interative network, on the other hand, are formed by means of ECL linkage elements (AND, NOR) with linkage functions which have been interchanged with one another with respect to the pulse modulated broad band signals. Thereby, what is meant by an interchange of the linkage function with respect to the pulse modulated broad band signal is an interchange of the two values of the input variables in the truth or, respectively, function table of the linkage elements, said input variables corresponding to the broad band signals. Thus, the cross-point switches lkt . . . pkt and lkq . . . pkq at which the broad band signals experienced no or, respective, two negations on their path proceeding from the input El, or, respectively, Ep are formed by AND elements of, for example, the type 10104; the cross-point switches lks . . . pks and lkr . . . pkr in whose case the broad band signals have experienced one negation (or, respectively, an uneven number of negations) on their path from the input El . . . Ep are, in contrast thereto, formed by means of NOR elements of, for example, the type 10102. Given such a realization with AND and NOR elements, moreover, the linkage functions are not only interchanged with one another with respect to the pulse modulated broad band signals, but rather, also with respect to the control signals to be supplied to the cross-point switches via their drive lines, which means that the control signals are to be supplied negated to the control inputs $\bar{s}$ of the cross-point switches formed by means of the NOR elements.

The drive lines $\bar{s}$ or, respectively, s of the cross-point switches . . . , lkq, . . . pkt, . . . , without this being illustrated in greater detail in FIG. 1, can be connected to the individual outputs of a drive decoder respectively allocated to a series of cross-point switches, for example, the cross-point switches lkt . . . pkt, proceeding from which drive decoder the individual cross-point switches can be respectively made conductive pulsewise by means of control pulses supplied at the proper time.

Figure 2:
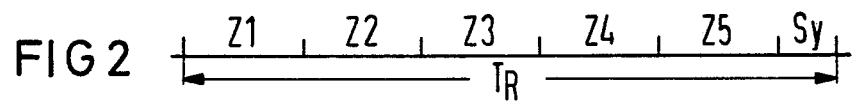
FIG. 2 illustrates the position of the time channels in a time-division multiplex frame.

Via the cross-point switches . . . , lkq, . . . pkt, . . . , the subscriber-individual outputs . . . , Aq, . . . , At, . . . are respectively connected to a respectively desired signal source-individual input of the broad band switching network in subscriber-individually determined time channels (preferably via subscriber return channels as were initially cited) of a time-division multiplex system. In this regard, please see FIG. 2 of the drawing which illustrates the chronological position of the time slots of such time channels in a time-division multiplex frame $T_R$. The time slots, more precisely stated, one respective time slot of each time channels are referenced there with Z1, Z2, Z3, Z4, Z5; a time slot of an additional synchronization channel is referenced with Sy, in which synchronization channel a synchronizing signal for the synchronization, for example, of demultiplexers on the subscriber side can be transmitted.

In the individual time channels Z preferably determined according to the measure of the respective receiver of a plurality of receivers provided at the subscriber, a subscriber . . . , Tq, . . . , Tt, . . . can be connected to the individual signal source-individual inputs El . . . Ep of the broad band switching network via the cross-point switches . . . , lkq, . . . , pkt, . . . respectively coming into consideration and actuated at the proper time, whereby one subscriber, under certain conditions, can also be connected in a plurality of time channels to one and the same input. Under certain conditions, at least one of the time channels Z (in FIG. 2) can also be excluded from a switching via the broad band switching network, as will be the case, for example, given its seizure with a 64-kbit/s unit (or: standard) channel of an integrated digital telecommunication network. So that a subscriber T (in FIG. 1) who is connected in a specific time channel Z (in FIG. 2) to a specific input E of the broad band switching network also receives the respectively desired broad band signal, for example, thus, the desired television program the signals of the individual signal sources Pl . . . Pp are multiply supplied, for example, in five different time positions according to FIG. 2, to the respective signal source-individual input El . . . Ep of the broad band switching network, being respectively supplied in time-division multiplex in a plurality of time channels Z of the time-division multiplex system encompassing at least these time channels Z, said plurality of time channels Z corresponding to the plurality of signal sources P which are simultaneously connectible to one and the same subscriber T (in FIG. 1).

Figure 3:
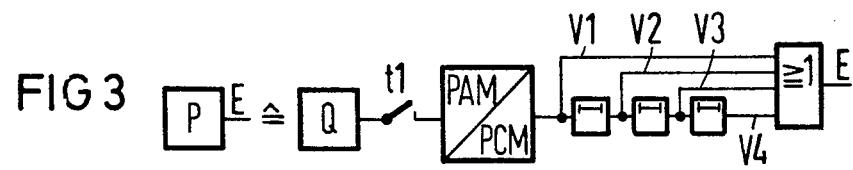
FIGS. 3 and 4 show further circuit-technical details.

To this end, as is indicated in FIG. 3, the actual signal source Q can be sampled with a sampling rate corresponding only to one time channel Z (in FIG. 2), i.e., at least with the minimum sampling rate given by the Shannon theorem, being repeatedly sampled with a period $T_R$ (in FIG. 2) at a respective point in time t1, for example, at the proper time at the beginning of each time slot Z1 (in FIG. 2), and the respective sampling value can be converted in a corresponding converter (for example, PAM/PCM) into a pulse modulated signal consisting of a plurality (PCM) of pulses or of one (PPM, PFM, PDM) bivalent impulse and the pulse modulated signal representing the sampling value respectively obtained can be fanned (fanned out) onto a plurality of line paths (V1, V2, V3, V4) corresponding to the said plurality of time channels (Z1 . . . Z4), delays which respectively differ stepwise by the duration of one time slot occurring in said line paths and said line paths leading at the output side to the respective signal source-individual input E of the broad band switching network.

Figure 4:
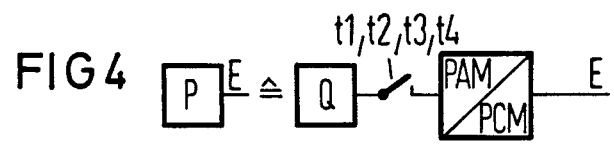

Instead of this, however, as indicated in FIG. 4, the actual signal source (Q) can also be sampled with a greater frequency corresponding to the number of time channels Z1 . . . Z4, said sampling being carried out in each period $T_R$ (in FIG. 2) at a plurality of points in time T1, T2, T3, T4, for example, at the proper time at the beginnings of the time slot Z1, Z2, Z3, Z4 (in FIG. 2), and the sampling value respectively obtained can be converted into bivalent pulse signals, whereupon these pulses are then supplied to the signal source-individual input E of the switching network in the appertaining time frames.

In both cases, it is assured that each broad band signal emitted by a signal source is available at the signal source-individual input E of the broad band switching network at each of the time channels and, accordingly, can be switched to the individual subscribers T via the cross-point switches . . . , lkq, . . . , pkt, . . . respectively coming into consideration.

It will be apparent that many modifications and variations may be effected without departing from the scope of the novel concepts and teachings of the present invention.

We claim as our invention:

1. A broad band switching system for the selective connection of broad band signal sources, particularly television program sources, to subscribers receiving broad band signals, said system comprising a broad band switching network via which the broad band signals, particularly television signals, are transmitted as pulse modulated signals, means whereby the signals of the individual signal sources (Pl ... Pp) are multiply supplied to the respective signal source-individual input (El ... Ep) of the broad band switching network, being respectively supplied in time-division multiplex in a plurality of time channels (Z1 ... Z4) of a time-division multiplex system encompassing at least these time channels (Z1 ... Z4), said plurality of time channels (Z1 ... Z4) corresponding to the number (4) of signal sources (Pl ... Pp) simultaneously connectible to one and the same subscriber (Tl ... Tt), and means whereby the broad band switching network connects the subscriber-individual outputs (Aq ... At) to the respectively desired signal source (Pl ... Pp) in subscriber-individually determined time channels (Z1 ... Z4) of the said plurality of time channels (Z1 ... Z4).

2. A broad band switching sytem according to claim 1, characterized in that a signal source (Q) is sampled with a frequency corresponding to the number of time channels (Z) and the pulse modulated signals representing the sampling values are supplied to the signal source-individual input (E) of the switching network.

* * * * *